United States Patent
Fox (10) Patent No.: US 8,752,681 B2
(45) Date of Patent: *Jun. 17, 2014

(54) INTEGRATED AND SELF-CONTAINED SUSPENSION ASSEMBLY HAVING AN ON-THE-FLY ADJUSTABLE AIR SPRING

(75) Inventor: Robert C. Fox, Los Gatos, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 12/768,523

(22) Filed: Apr. 27, 2010

(65) Prior Publication Data

US 2010/0263974 A1    Oct. 21, 2010

Related U.S. Application Data

(63) Continuation of application No. 10/237,333, filed on Sep. 5, 2002, now Pat. No. 7,703,585.

(60) Provisional application No. 60/391,991, filed on Jun. 25, 2002, provisional application No. 60/392,802, filed on Jun. 28, 2002.

(51) Int. Cl.
  *F16F 9/34* (2006.01)
(52) U.S. Cl.
  USPC ................ 188/299.1; 188/278; 188/322.13; 267/64.28
(58) Field of Classification Search
  None
  See application file for complete search history.

(56) References Cited

U.S. PATENT DOCUMENTS

| 1,094,567 | A | 4/1914 | Hofmann |
| 1,281,079 | A | 10/1918 | Sears |
| 1,492,328 | A | 4/1924 | Lang |
| 2,101,265 | A | 12/1937 | Mercier |
| 2,115,072 | A | 4/1938 | Hunt |
| 2,329,803 | A | 9/1943 | Whistler |
| 2,569,503 | A | 10/1951 | Thelander |
| 2,774,448 | A | 12/1956 | Hultin |
| 2,894,742 | A | 7/1959 | Peterson |

(Continued)

FOREIGN PATENT DOCUMENTS

| DE | 837508 C | 4/1952 |
| DE | 1455159 A1 | 3/1969 |

(Continued)

OTHER PUBLICATIONS

Fox document various articles—Motocross Action Dec. 1981; Fox Factory 1983; Moto-X Fox 1981; Vanilla Float 1998; Mountain Biking Oct. 1998;Cycle World Dec. 1981, date unknown.

(Continued)

*Primary Examiner* — Xuan Lan Nguyen
(74) *Attorney, Agent, or Firm* — Patterson & Sheridan, L.L.P.; David M. Haugen (57) ABSTRACT

An integrated and self-contained suspension assembly having a gas spring integrated with a shock absorber (damper) is described. The rigid gas cylinder of the air spring is divided into a first gas chamber and a second gas chamber. A flow port connects the first and second gas chambers, and can be manually opened or closed by valve and a simple one-quarter turn rotation of an external knob to instantly switch the gas spring between two different spring rates. The different spring rates are functions of the separate or combined volumes of the two gas chambers. The integrated suspension assembly is compactly packaged and self-contained, i.e., does not require any externalities, such as gas sources or electricity, to operate.

14 Claims, 11 Drawing Sheets

(56) References Cited

U.S. PATENT DOCUMENTS

| | | |
|---|---|---|
| 3,001,538 A | 9/1961 | Du Bois |
| 3,039,761 A | 6/1962 | Van Zijp |
| 3,085,771 A | 4/1963 | Peterson |
| 3,086,786 A | 4/1963 | Tuckzek |
| 3,114,705 A | 12/1963 | Pribonic |
| 3,201,110 A | 8/1965 | Taccone |
| 3,202,413 A | 8/1965 | Colmerauer |
| 3,237,726 A | 3/1966 | Dyerling |
| 3,319,741 A | 5/1967 | Hauck |
| 3,338,347 A | 8/1967 | Avner |
| 3,379,430 A | 4/1968 | Hennells |
| 3,414,092 A | 12/1968 | Speckhart |
| 3,722,875 A | 3/1973 | Hasse |
| 3,836,132 A | 9/1974 | McNally et al. |
| 3,856,287 A | 12/1974 | Freitag |
| 3,970,292 A | 7/1976 | Dachicourt et al. |
| 4,122,923 A | 10/1978 | Ellis et al. |
| 4,132,395 A | 1/1979 | Fox, Jr. |
| 4,145,067 A | 3/1979 | Ceriani |
| 4,159,105 A | 6/1979 | Vander Laan et al. |
| 4,206,934 A | 6/1980 | McKee |
| 4,254,849 A | 3/1981 | Pohlenz |
| 4,256,293 A | 3/1981 | Burgess |
| 4,295,658 A | 10/1981 | Kashima |
| 4,313,529 A | 2/1982 | Kato et al. |
| 4,325,541 A | 4/1982 | Korosladanyi et al. |
| 4,492,290 A | 1/1985 | Zavodny |
| 4,509,730 A | 4/1985 | Shtarkman |
| 4,527,676 A | 7/1985 | Emura et al. |
| 4,530,425 A | 7/1985 | Veaux et al. |
| 4,534,580 A | 8/1985 | Kobayashi et al. |
| 4,572,317 A | 2/1986 | Isono et al. |
| 4,576,258 A | 3/1986 | Spisak et al. |
| 4,591,186 A | 5/1986 | Ashiba |
| 4,592,540 A | 6/1986 | Yokoya et al. |
| 4,598,929 A | 7/1986 | Kumagai et al. |
| 4,606,440 A | 8/1986 | Buchanan, Jr. et al. |
| 4,613,116 A | 9/1986 | Buma |
| 4,616,811 A | 10/1986 | Buma |
| 4,620,619 A | 11/1986 | Emura et al. |
| 4,629,170 A | 12/1986 | Warmuth, II |
| 4,635,906 A | 1/1987 | Buma |
| 4,647,069 A | 3/1987 | Iijima |
| 4,650,212 A | 3/1987 | Yoshimura |
| 4,651,977 A | 3/1987 | Buma |
| 4,653,735 A | 3/1987 | Buma |
| 4,659,070 A | 4/1987 | Buma |
| 4,660,688 A | 4/1987 | Spisak et al. |
| 4,660,810 A | 4/1987 | Buma |
| 4,666,135 A | 5/1987 | Buma et al. |
| 4,671,534 A | 6/1987 | Yano |
| 4,673,171 A | 6/1987 | Buma |
| 4,686,626 A | 8/1987 | Kuroki et al. |
| 4,697,796 A | 10/1987 | Kitamura et al. |
| 4,717,173 A | 1/1988 | Sugasawa et al. |
| 4,735,401 A | 4/1988 | Buma et al. |
| 4,741,554 A | 5/1988 | Okamoto |
| 4,743,000 A | 5/1988 | Karnopp |
| 4,746,106 A | 5/1988 | Fukumura |
| 4,768,758 A | 9/1988 | Buma |
| 4,773,635 A | 9/1988 | Buma |
| 4,787,644 A | 11/1988 | Yokote et al. |
| 4,789,051 A | 12/1988 | Kruckemeyer et al. |
| 4,827,416 A | 5/1989 | Kawagoe et al. |
| 4,844,428 A | 7/1989 | Margolis et al. |
| 4,899,853 A | 2/1990 | Hummel |
| 4,901,986 A | 2/1990 | Smith |
| 4,917,222 A | 4/1990 | Simon Bacardit et al. |
| 4,936,423 A | 6/1990 | Karnopp |
| 4,936,424 A | 6/1990 | Costa |
| 4,944,705 A | 7/1990 | Kashima et al. |
| 4,958,706 A | 9/1990 | Richardson et al. |
| 4,974,820 A | 12/1990 | Nakanishi |
| 4,993,523 A | 2/1991 | Schwemmer et al. |
| 4,999,872 A | 3/1991 | Jentsch |
| 5,037,062 A | 8/1991 | Neuhaus |
| 5,072,813 A | 12/1991 | Yoshioka et al. |
| 5,080,205 A | 1/1992 | Miller et al. |
| 5,111,735 A | 5/1992 | Johnson |
| 5,139,119 A | 8/1992 | Karnopp |
| 5,150,775 A | 9/1992 | Charles et al. |
| 5,158,270 A | 10/1992 | Lin |
| 5,163,538 A | 11/1992 | Derr et al. |
| 5,169,129 A | 12/1992 | Hoffman |
| 5,180,186 A | 1/1993 | Charles et al. |
| 5,186,481 A | 2/1993 | Turner |
| 5,201,388 A | 4/1993 | Malm et al. |
| 5,201,389 A | 4/1993 | Miller et al. |
| 5,228,640 A | 7/1993 | Mouille |
| 5,251,927 A | 10/1993 | Charles et al. |
| 5,275,264 A | 1/1994 | Isella |
| 5,285,875 A | 2/1994 | Munoz |
| 5,285,876 A | 2/1994 | Shimizu et al. |
| 5,332,068 A | 7/1994 | Richardson et al. |
| 5,346,236 A | 9/1994 | Ohma |
| 5,360,089 A | 11/1994 | Nakamura et al. |
| 5,386,893 A | 2/1995 | Feigel |
| 5,396,973 A | 3/1995 | Schwemmer et al. |
| 5,413,316 A | 5/1995 | Easter |
| 5,428,533 A | 6/1995 | Ogawa |
| 5,462,140 A | 10/1995 | Cazort et al. |
| 5,509,674 A | 4/1996 | Browning |
| 5,529,152 A | 6/1996 | Hamilton et al. |
| 5,533,597 A | 7/1996 | Nezu et al. |
| 5,538,276 A | 7/1996 | Tullis |
| 5,586,781 A | 12/1996 | Anderson |
| 5,598,903 A | 2/1997 | Richardson |
| 5,632,471 A | 5/1997 | Pradel |
| 5,653,315 A | 8/1997 | Ekquist et al. |
| 5,775,677 A | 7/1998 | Englund |
| 5,799,758 A | 9/1998 | Huang |
| 5,803,482 A | 9/1998 | Kim |
| 5,823,305 A | 10/1998 | Richardson et al. |
| 5,842,688 A | 12/1998 | Dore et al. |
| 5,915,674 A | 6/1999 | Wolf et al. |
| 5,921,572 A | 7/1999 | Bard et al. |
| 5,954,167 A | 9/1999 | Richardson et al. |
| 5,957,252 A | 9/1999 | Berthold |
| 5,971,116 A | 10/1999 | Franklin |
| 6,029,958 A | 2/2000 | Larsson et al. |
| 6,095,541 A | 8/2000 | Turner et al. |
| 6,105,987 A | 8/2000 | Turner |
| 6,105,988 A | 8/2000 | Turner et al. |
| 6,109,400 A | 8/2000 | Ayyildiz et al. |
| 6,119,830 A | 9/2000 | Richardson et al. |
| 6,135,434 A | 10/2000 | Marking |
| 6,267,400 B1 | 7/2001 | McAndrews |
| 6,279,703 B1 | 8/2001 | Mete |
| 6,296,092 B1 | 10/2001 | Marking et al. |
| 6,311,962 B1 | 11/2001 | Marking |
| 6,318,525 B1 | 11/2001 | Vignocchi et al. |
| 6,340,153 B1 | 1/2002 | Miesner |
| 6,360,857 B1 | 3/2002 | Fox et al. |
| 6,386,525 B1 | 5/2002 | Stuart |
| 6,412,759 B1 | 7/2002 | Krauss |
| 6,415,895 B2 | 7/2002 | Marking et al. |
| 6,457,730 B1 | 10/2002 | Urbach |
| 6,464,053 B1 | 10/2002 | Hoebrechts |
| 6,464,201 B2 | 10/2002 | Job |
| 6,467,592 B1 | 10/2002 | Dernebo |
| 6,491,146 B1 | 12/2002 | Yi et al. |
| 6,508,460 B2 | 1/2003 | Job |
| 6,543,754 B2 | 4/2003 | Ogura |
| 6,581,948 B2 | 6/2003 | Fox |
| 6,604,751 B2 | 8/2003 | Fox |
| 6,659,240 B2 | 12/2003 | Dernebo |
| 6,659,241 B2 | 12/2003 | Sendrea |
| 6,688,626 B2 | 2/2004 | Felsl et al. |
| 6,698,730 B2 | 3/2004 | Easter |
| 6,708,803 B2 | 3/2004 | Jensen |
| 6,722,678 B2 | 4/2004 | McAndrews |
| 6,786,498 B1 | 9/2004 | Chang |
| 6,824,145 B2 | 11/2004 | Kang |
| 6,883,810 B2 | 4/2005 | Svartz et al. |

(56) References Cited

U.S. PATENT DOCUMENTS

| | | |
|---|---|---|
| 6,938,887 B2 | 9/2005 | Achenbach |
| 6,974,001 B2 | 12/2005 | Bauman |
| 7,000,907 B2 | 2/2006 | Achenbach |
| 7,017,928 B2 | 3/2006 | Felsl et al. |
| 7,128,192 B2 | 10/2006 | Fox |
| 7,703,585 B2 | 4/2010 | Fox |
| 2002/0117830 A1 | 8/2002 | Holt et al. |
| 2002/0175035 A1 | 11/2002 | Achenbach |
| 2003/0234144 A1 | 12/2003 | Fox |
| 2004/0020730 A1 | 2/2004 | Turner |
| 2004/0061303 A1 | 4/2004 | Felsl et al. |
| 2004/0222056 A1 | 11/2004 | Fox |
| 2004/0232650 A1 | 11/2004 | Felsl et al. |
| 2004/0245746 A1 | 12/2004 | Chamberlain et al. |
| 2005/0012297 A1 | 1/2005 | Miyoshi et al. |
| 2005/0023094 A1 | 2/2005 | McAndrews |
| 2005/0104320 A1 | 5/2005 | Wesling et al. |
| 2005/0116399 A1 | 6/2005 | Jordan et al. |
| 2005/0173212 A1 | 8/2005 | Vogelsang et al. |
| 2005/0212187 A1 | 9/2005 | Achenbach |
| 2006/0289258 A1 | 12/2006 | Fox |
| 2008/0116622 A1 | 5/2008 | Fox |

FOREIGN PATENT DOCUMENTS

| | | |
|---|---|---|
| DE | 3233160 A1 | 3/1984 |
| DE | 4018712 A1 | 12/1991 |
| DE | 4429562 A1 | 2/1996 |
| DE | 10236621 A1 | 3/2004 |
| DE | 102004021586 A1 | 12/2005 |
| EP | 166702 A2 | 1/1986 |
| EP | 0245221 A2 | 11/1987 |
| EP | 0420610 A1 | 4/1991 |
| EP | 474171 A1 | 3/1992 |
| EP | 0541891 A1 | 5/1993 |
| EP | 0834448 A2 | 4/1998 |
| EP | 1464866 A2 | 10/2004 |
| ES | 8608123 A1 | 11/1986 |
| FI | 931949 A | 4/1993 |
| FR | 1174491 A | 3/1959 |
| FR | 2728948 A1 | 7/1996 |
| FR | 2863328 A1 | 6/2005 |
| GB | 0835151 A | 5/1960 |
| GB | 2265435 A | 9/1993 |
| GB | 2286566 A | 8/1995 |
| IT | 1237933 B | 6/1993 |
| IT | 1247985 B | 1/1995 |
| JP | 57018509 A | 1/1982 |
| JP | 59026639 A | 2/1984 |
| JP | 61235212 A | 10/1986 |
| JP | 61135808 | 12/1991 |
| JP | 07167189 A | 7/1995 |
| SU | 0623759 A1 | 9/1978 |
| WO | WO-9903726 A1 | 1/1999 |
| WO | WO-9910223 A1 | 3/1999 |
| WO | WO-9914104 A1 | 3/1999 |
| WO | WO-9925989 A2 | 5/1999 |
| WO | WO-03029687 A1 | 4/2003 |
| WO | WO-2004016966 A1 | 2/2004 |
| WO | WO-2004041563 A1 | 5/2004 |

OTHER PUBLICATIONS

Ceriani 1 various articles, date unknown.
Mountain Bike Action—various articles dated Feb. 1992, Jan. 1993, Nov. 1991, Jan. 1993, Dec. 1997 and Feb. 1991.
Bicycling Aug. 1993.
Mountain Biking Oct. 1996.
Bike Pulse May 2000.
Road Bike Aug. 1993.
Mountain Bike Aug. 2001.
Collection of Rock Shox Documents—various articles dated 1993, 1996-1998, 2000, 2004.
Cannondale Documents—various articles dated 1993 and date unknown.
Marzocchi literature, date unknown.
Bicycle Guide Jul. 1994.
Various Articles: Maverick American, Paul Turner, Profile.
Sospensioni Jan. 1993.
Mountain Tutto Bike Sep. 1992.
Bici Da Montagna Mar. 1994.
Listing of Forks, date unknown, unidentified, 1987-1991.
Remote Adjustable Air Chamber (Risse Racing) (2 pages), 1999/2005.
Showa Advertisment, Mountain Bike 22-23 (Jun. 1994) (3 pages).
Rick Sieman, Do it yourself Tech-Dial in Your Own Forks (www.off-road.com/dirtbike/tech/forks) (Jul. 1, 2005) (6 pages).
How to Improve the Ride and Suspension Performance of Cruiser Motorcycles (6 pages) (2006).
Suspension Tuning Guide—Learning the Lingo (2 pages), date unknown.
Rock Shox Fork SID Manuals (1998-2000) (15 pages).
Cane Creek AD-10 and AD-12 Literature (7 pages), date unknown.
Rock Shox Shock SID Manuals (1999 and 2001).
Mike Rosso—How to Set KTM Fork Oil Level (www.4strokes.com) (1 page), date unknown.
Fox Factory Catalog (Twin-Clicker Shox) 1983.
The History of FOX Air Shocks (2001).
Fox Twin-Clicker Owner's Manual Dec. 1981.
Basic SID Rear Shock Dimensional Drawings, date unknown.
Two pages from Fox Factory 2008 Aftermarket Catalog (re DHX).

INTEGRATED AND SELF-CONTAINED SUSPENSION ASSEMBLY HAVING AN ON-THE-FLY ADJUSTABLE AIR SPRING

CROSS-REFERENCE TO RELATED APPLICATIONS

This application is a continuation of U.S. patent application Ser. No. 10/237,333, filed Sep. 5, 2002, now U.S. Pat. No. 7,703,585, which claims benefit of U.S. provisional patent application Ser. No. 60/391,991, filed Jun. 25, 2002, and U.S. provisional patent application Ser. No. 60/392,802, filed Jun. 28, 2002. Each of the aforementioned related patent applications is herein incorporated by reference.

BACKGROUND OF THE INVENTION

1. Field of the Invention

A preferred embodiment relates to air springs for vehicle suspensions and preferably two-wheeled vehicle suspensions, such as the suspensions of bicycles, which are typically mounted between the chassis of the vehicle and a wheel. In particular, a preferred embodiment relates to an air spring, optionally combined with a shock absorber or other damper to form an integrated suspension unit, which permits instant selection between two different spring rate curves by simply rotating an external knob one-quarter turn.

2. Description of the Related Art

One advantage of air springs is the ability to change spring rate ("softer" or "stiffer") simply by adjusting the internal air pressure. Such a method permits changing the spring rate curve of an air spring, and is available for essentially all air springs. On many air springs this is accomplished relatively easily by pressurizing or de-pressurizing the air spring with a hand pump and gauge, or by using an air pressure hose at an automobile service station ("gas station"). Most air springs are purposely designed with a standardized Schrader air valve (similar to those in automobile tires) to make this relatively easy and convenient.

As is known in the art, spring rate characteristics can also be changed by altering the initial air chamber volume. Increasing or decreasing initial air chamber volume softens or stiffens, respectively, the air spring curve.

Conventional prior-art air springs for bicycles and motorcycles have been known to provide features for altering air chamber volume. The most common method, used especially in air-sprung mountain bike front forks, is to increase or decrease air chamber volume by adding or removing hydraulic fluid ("changing the oil level"). In other cases, air spring suspension components have been provided with solid, lightweight, "volume plugs". The air spring is opened and the "volume plugs" are added or removed from the air chamber. Both methods, of course, generally require depressurization and opening of the hydraulic unit and/or the air spring.

Another feature known in the art for altering the air chamber volume on certain bicycle and motorcycle air springs has been an adjustable-position threaded cap closing off the air chamber. Threading this cap in or out, which can require a fair amount of torque to overcome frictional forces resulting from the internal pressure, changes the air chamber volume. For example, U.S. Pat. No. 5,346,236 teaches this for a bicycle front fork. Also known in the art is a threaded-cap adjustable-volume external air reservoir which can be added to a basic shock absorber or fork air spring. Changes of this type can typically be accomplished faster than adding or removing hydraulic fluid, and may be accomplished in about 1 minute.

Motorcycles having air suspension with an on-board pressurization system including an on-board air compressor to monitor and regulate air pressure on demand, are also known in the art.

There is a need in bicycles and motorcycles which incorporate air spring suspension for a quick, easy way to alter the air spring curve "on-the-fly". All the prior-art methods noted above suffer from various limitations, including time and effort required, weight, bulk, complexity, and cost.

SUMMARY OF THE INVENTION

One aspect of a preferred embodiment is to provide a suspension air spring, optionally integrated with a shock absorber or other damper, that permits instant selection between "soft" and "firm" spring rate curves by simply turning an external knob one-quarter turn. This is much quicker and easier than other methods provided by conventional prior-art designs. The illustrated embodiments are particularly applicable to bicycles.

In the context of real-world mountain biking, all prior-art methods of changing air spring rates create a significant interruption in the ride, and thus typically are done infrequently, or not at all, during a ride. In contrast, turning an external knob as described according to a preferred embodiment is so quick and simple that it can be done in a routine "on-the-fly" manner dozens of times as desired during a typical ride. Since terrain and trail conditions constantly change, this greatly benefits the rider by enabling him/her to continuously select the best spring rate for the current situation.

The illustrated embodiments achieve this result by partitioning the air spring (more generally, "gas spring") into two separate partial volumes. The two partial volumes are connected by a sealed passage which is selectively opened or closed by turning an external knob. Turning the knob rotates a cam which desirably is in contact with a cam follower. The cam follower then preferably moves a check ball up or down, causing the ball to either seat on or unseat from, respectively, a seal in the connecting passage.

When the check ball is seated, the passage is closed and air flow from the first partial volume to the second partial volume is blocked. This isolates the second partial volume and prevents it from physically participating as a part of the air spring upon compression of the suspension. As is well-known in the art, air spring characteristics depend upon the initial pressure and volume characteristics of the air spring. When the total initial volume is effectively reduced, as occurs here when the passage leading to the second partial volume is blocked, the air spring characteristic ("spring curve") becomes firmer.

When the check ball is unseated, the passage is open and air flow between the two partial volumes is unrestricted. This, of course, makes both partial volumes physically available to the air spring, and results in greater total initial volume and a softer air spring characteristic.

A preferred embodiment is an air spring for a two wheeled vehicle. The air spring being positionable between a vehicle sprung mass and a vehicle wheel. The air spring includes an air cylinder closed at one end and connectable to one of a vehicle sprung mass and a vehicle wheel. A piston is in axially-slidable engagement with the air cylinder and is connectable to the other of a vehicle sprung mass and a vehicle wheel. A partitioning member is positioned within the cylinder and at least partially divides the cylinder into a primary air chamber and a secondary air chamber. A passage connects the primary air chamber and the secondary air chamber and a valve assembly is configured to selectively permit air flow through the passage.

Another preferred embodiment is a gas spring assembly including a body portion and a shaft portion. The shaft portion is telescopingly engaged with the body portion. A piston is carried by the shaft portion and cooperates with the body portion to define a variable volume first gas chamber. One of the shaft portion and the body portion at least partially defines a second gas chamber. A valve assembly is positionable in a first position and a second position. In the first position, the valve assembly substantially prevents communication between the first gas chamber and the second gas chamber and in the second position, the valve assembly permits communication between the first gas chamber and the second gas chamber.

Another aspect of the present invention involves a front suspension fork assembly positionable on a bicycle. The front fork assembly includes a gas spring assembly having a body portion and a shaft portion. The shaft portion is telescopingly engaged with the body portion. A piston is carried by the shaft portion and cooperates with the body portion to define a variable volume first gas chamber. One of the shaft portion and the body portion at least partially defines a second gas chamber. A valve assembly is positionable in a first position and a second position. In the first position, the valve assembly substantially prevents communication between the first gas chamber and the second gas chamber and in the second position, the valve assembly permits communication between the first gas chamber and the second gas chamber. The valve assembly is movable between the first position and the second position by an actuator positioned to be accessible to a hand of a rider of the bicycle while riding.

DETAILED DESCRIPTION

The prior-art integrated suspension unit 100 of FIGS. 1 and 2 will be described first, in order to provide a point of departure for better understanding the improvements of the preferred embodiments, which will be described further on.

Figures 1, 2:
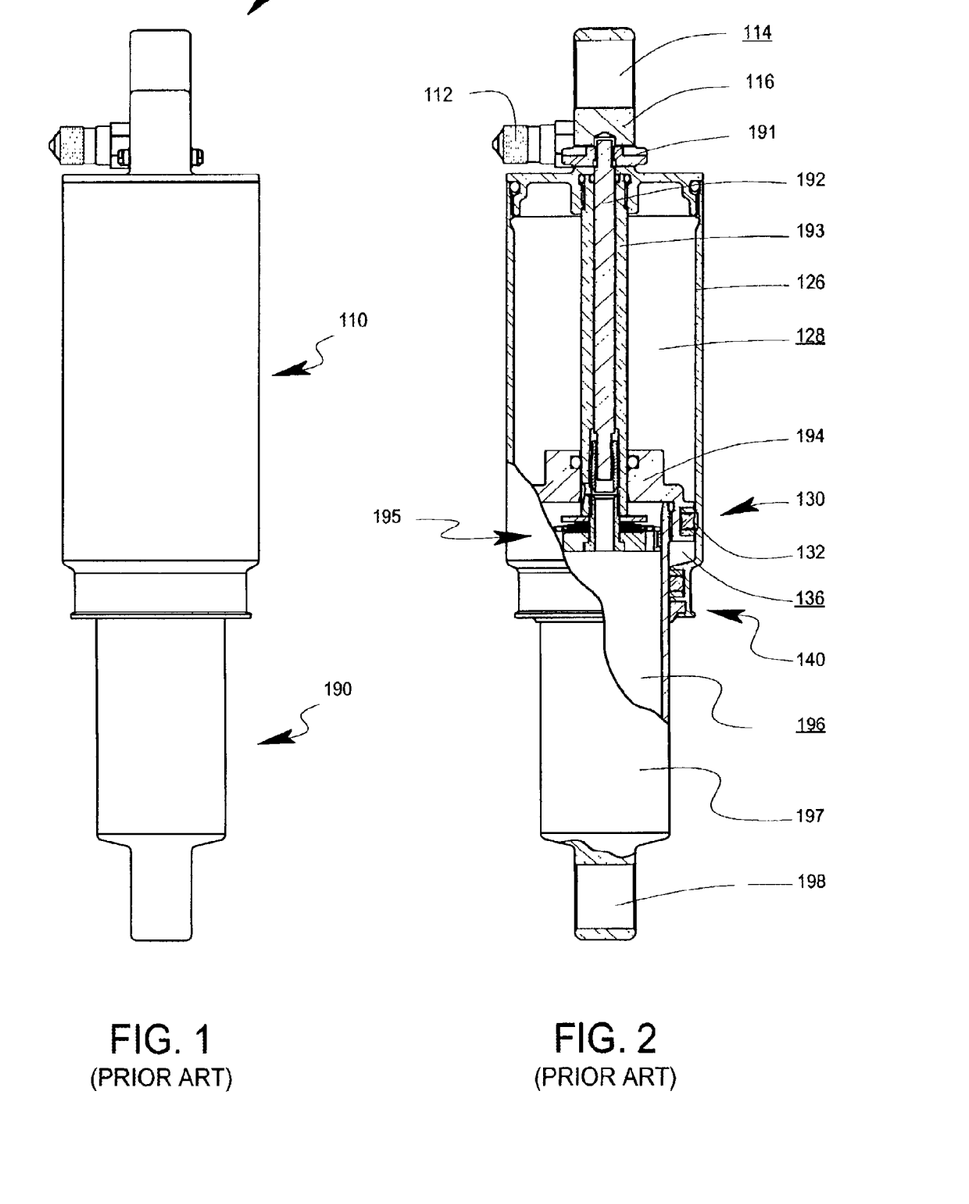
FIG. 1 is an overall front view of a prior-art embodiment of a suspension unit consisting of a shock absorber ("damper") integrated with an air spring.
FIG. 2 is a partial sectional front view of the prior-art suspension unit of FIG. 1.

The typical prior-art integrated suspension unit 100 as shown in FIGS. 1 and 2 is manufactured by Fox Racing Shox. It is to be understood, of course, that this specific prior-art embodiment is representative only, and that the present air spring arrangement can be applied to other types of suspension units. Additionally, the present air spring arrangement can be applied as a separate air spring unit, not integrated with a damper.

In FIGS. 1 and 2 the integrated suspension unit 100 is comprised of an air spring assembly 110 and a damper assembly 190. The integration is seamless, with several of the components such as an upper eyelet housing 116 and seal head 194 shared by both assemblies and performing dual functional roles. For example, as part of the damper assembly 190, the seal head 194 closes and seals off one end of the shock body 197. At the same time, as part of the air spring assembly 110, the seal head 194 also seals off the open end of the air cylinder 126 and functions as a piston of the air spring assembly 110. The air cylinder 126 functions as a body portion of the air spring assembly 110 and the shock body 197 functions as a shaft portion of the air spring assembly 110.

Still referring to FIGS. 1 and 2, the ends of the integrated suspension unit 100, the upper eyelet 114 and the lower eyelet 198, are connected to the sprung and unsprung portions of the vehicle (not shown) in a conventional manner. The air pressure in the positive air chamber 128 creates a force tending to lengthen the suspension unit 100, while pressure in the negative air chamber 136 tends to shorten it. As is well-known in the art, the net effect of these opposing forces is to create a desirable air spring curve ("force vs. travel curve"), especially in that portion of the travel regime where the suspension unit 100 is near full extension.

In particular, it is well-known that without the counteracting force produced by the negative air chamber 136, which rapidly increases as the shock absorber approaches full extension and the volume of the negative air chamber 136 rapidly decreases, the initial portion of the spring curve ("spring preload") would be quite stiff. Thus, an undesirably large beginning force would be required to initiate the first portion of travel from full extension.

Figure 3:
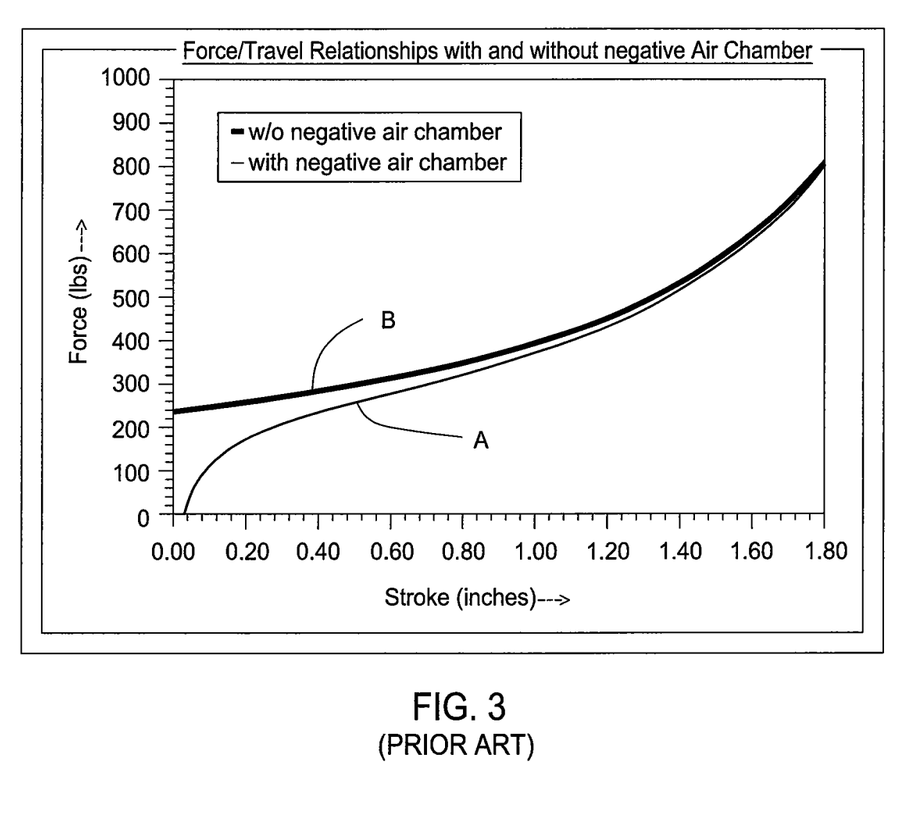
FIG. 3 illustrates the effect of the negative chamber by comparing the spring curve of the prior-art suspension unit of FIG. 2 with the spring curve it would have if the negative chamber was eliminated.

Typical spring curves produced with and without the negative air chamber 136 are illustrated in FIG. 3. Curve "A" shows a force versus travel spring curve that would be produced by the embodiment of FIG. 2, which includes the negative air chamber 136. In contrast, Curve "B" shows the spring curve that would result if the negative air chamber 136 was removed (not shown). On a bicycle, or other vehicle, spring curve "B" would generally produce an undesirably harsh ride due to the large initial force required to initiate travel from full extension.

The positive air chamber 128 is pressurized via the air valve 112. As is typical, an air passage (not shown) is drilled in the upper eyelet housing 116, and leads from the air valve 112 to the positive air chamber 128.

The negative air chamber 136 is pressurized via a transfer port 132. Transfer occurs at that pre-determined point near the beginning of suspension travel where the transfer port 132 bridges the positive/negative seal assembly 130, as depicted in FIG. 2. This air transfer feature provides an effective and simple means for properly balancing the pressures of the positive air chamber 128 and the negative air chamber 136, and is more fully described in U.S. Pat. No. 6,135,434.

The positive/negative seal assembly 130 provides a moving seal between the positive air chamber and the negative air chamber and seals at all times except when bridged by the transfer port 132. The inside bore of the air cylinder 126 is burnished or otherwise finished to provide a smooth, low-friction surface which seals well.

The negative chamber seal assembly 140 seals the lower side of the negative chamber on the outside of the shock body 197, which is burnished or otherwise finished to provide a smooth, low-friction surface which seals well.

The prior-art integrated suspension unit 100 of FIGS. 1 and 2 includes provisions for adjusting the internal damping by rotating a damping adjuster knob 191 which, in turn, rotates the damping adjuster rod 192 which extends down the shaft 193 into the piston assembly 195. This basic construction, available in many conventional high-performance shock absorbers and well-known to those skilled in the art, enables external adjustability of compression damping, rebound damping, or both.

Figure 6:
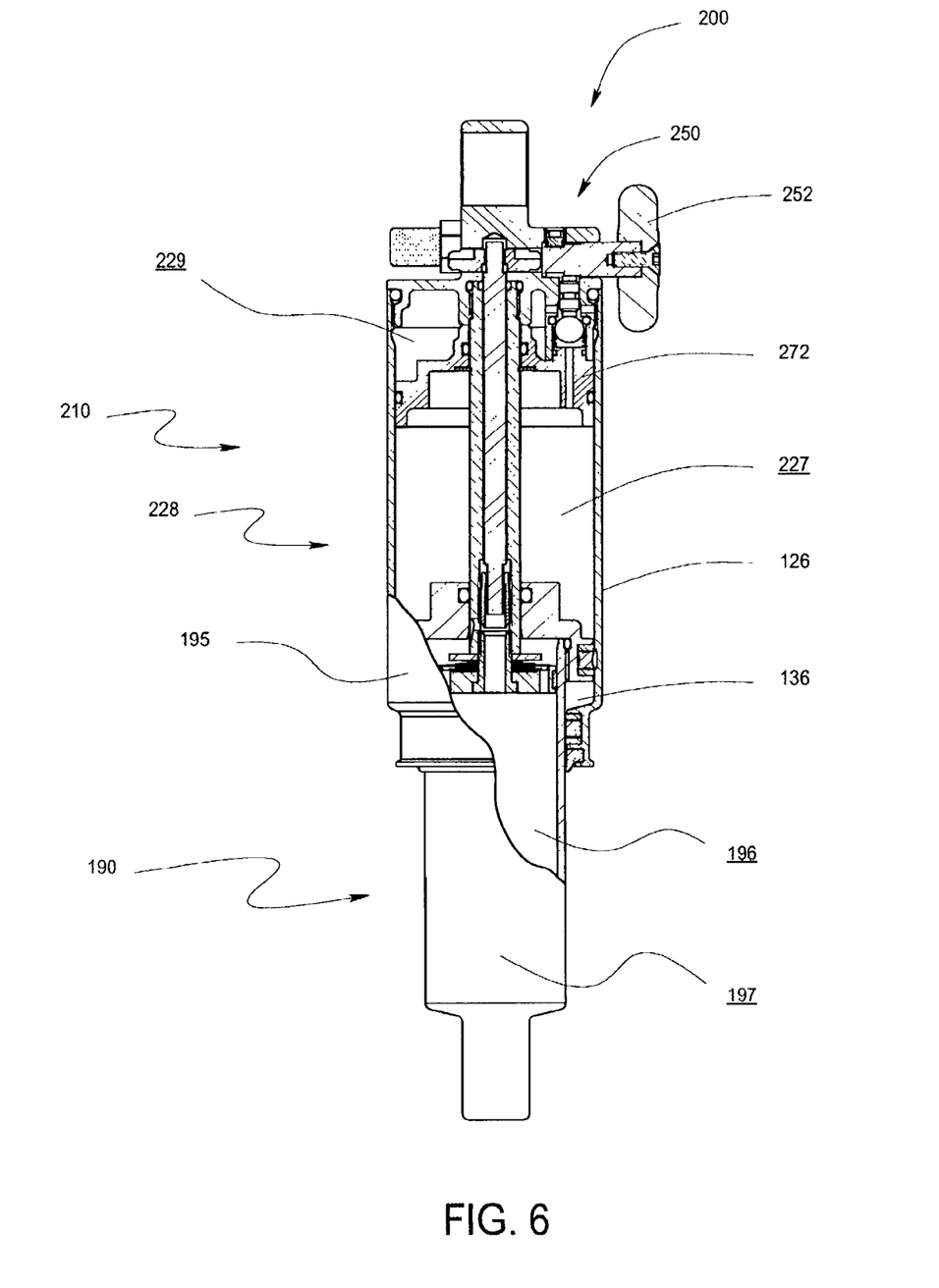
FIG. 6 is a partial sectional front view of the suspension unit of FIG. 4.
Figure 16:
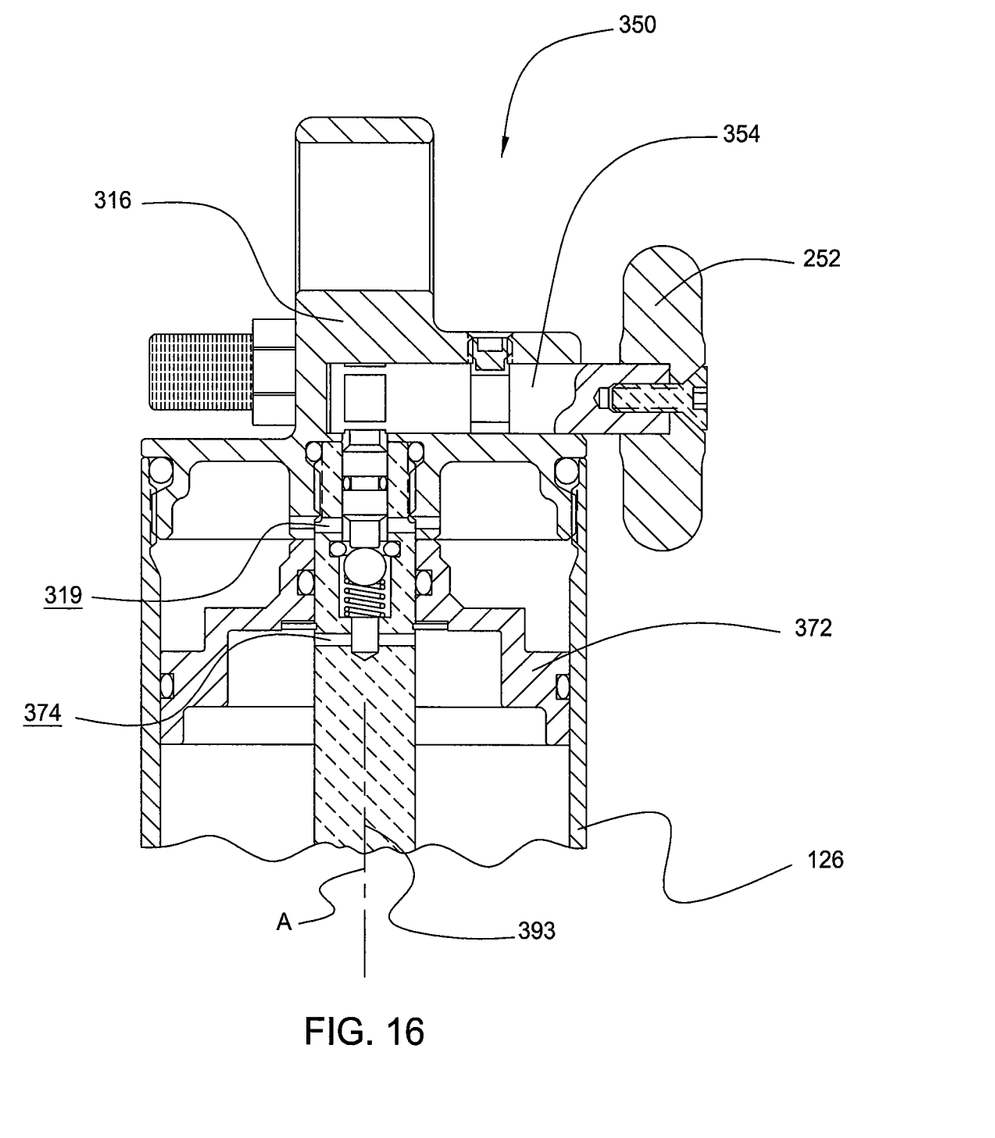
FIG. 16 shows an alternate embodiment of a suspension unit, where the connecting passageway occurs through the center shaft.

Although this damper construction feature is not required for application of the preferred embodiments, it is illustrated here in the prior-art and it is also included in the illustrated embodiment shown in FIG. 6. If this adjustable damping feature is not included, a somewhat simplified and less costly preferred embodiment, as described later and illustrated in FIG. 16, is made possible.

The rest of the prior-art integrated suspension unit 100, including the piston assembly 195 of the damper assembly 190 which creates damping as it moves thru the damping fluid 196, are not illustrated or described in further detail since they are conventional features well-known to those skilled in the art, and are not required for an understanding of the preferred embodiments.

Figure 4:
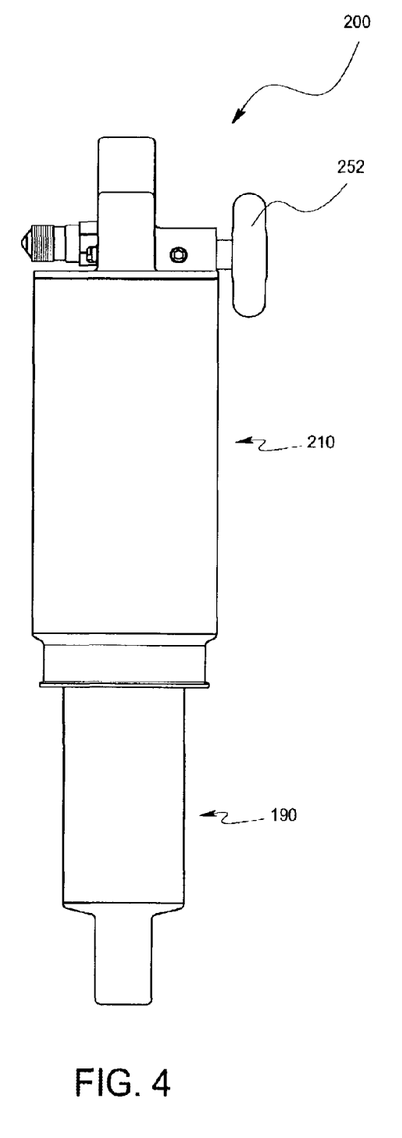
FIG. 4 is an overall front view of a preferred embodiment of a suspension unit.
Figure 5:
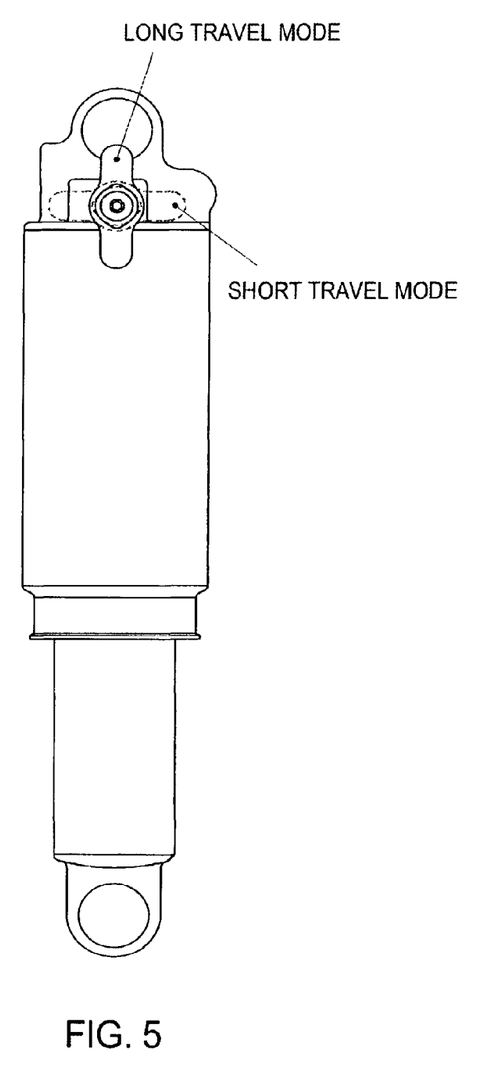
FIG. 5 is an overall side view of the suspension unit of FIG. 4.

External views of a preferred embodiment are shown in FIGS. 4 and 5. Suspension unit 200 comprises a damper assembly 190 identical to that of FIG. 1, and an adjustable air spring assembly 210. A manually-operable travel adjust lever 252 extends from the upper portion of suspension unit 200. The travel adjust lever 252 can be rotated 90-degrees clockwise or counterclockwise between the two positions shown, the "long-travel mode" and the "short-travel mode", as will be described more fully further on.

FIG. 6 shows a partial sectional view of the suspension unit 200 of FIG. 4. In comparison to the prior-art device of FIGS. 1 and 2, the damper assembly 190 of FIG. 6 is identical to the damper assembly 190 of FIGS. 1 and 2; however, the adjustable air spring assembly 210 of FIG. 6 contains additional structure and modified structure as compared with air spring assembly 110 of FIGS. 1 and 2. The additional and modified structure comprises an air cylinder partition 272 sealed within the air cylinder 126 which separates the divided positive air chamber 228 into a first partial volume 227 and a second partial volume 229, and a travel adjust assembly 250 which enables these two partial volumes to be either connected or separated by rotation of the external travel adjust lever 252.

Figure 7:
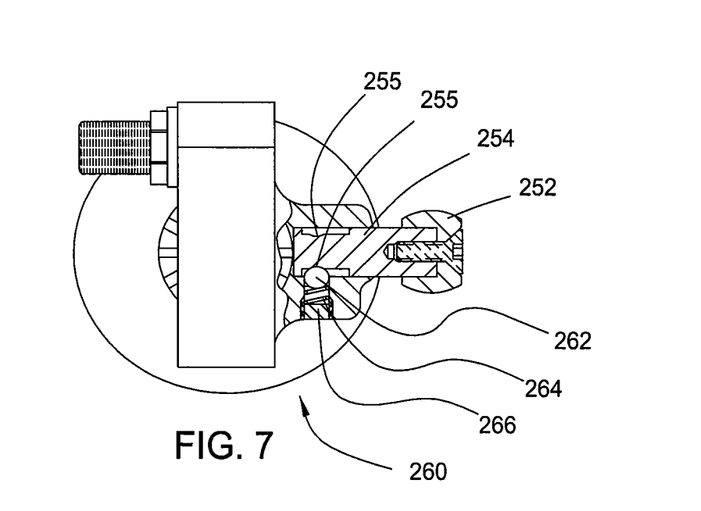
FIG. 7 is a partial sectional top view of the suspension unit of FIG. 6.
Figure 8:
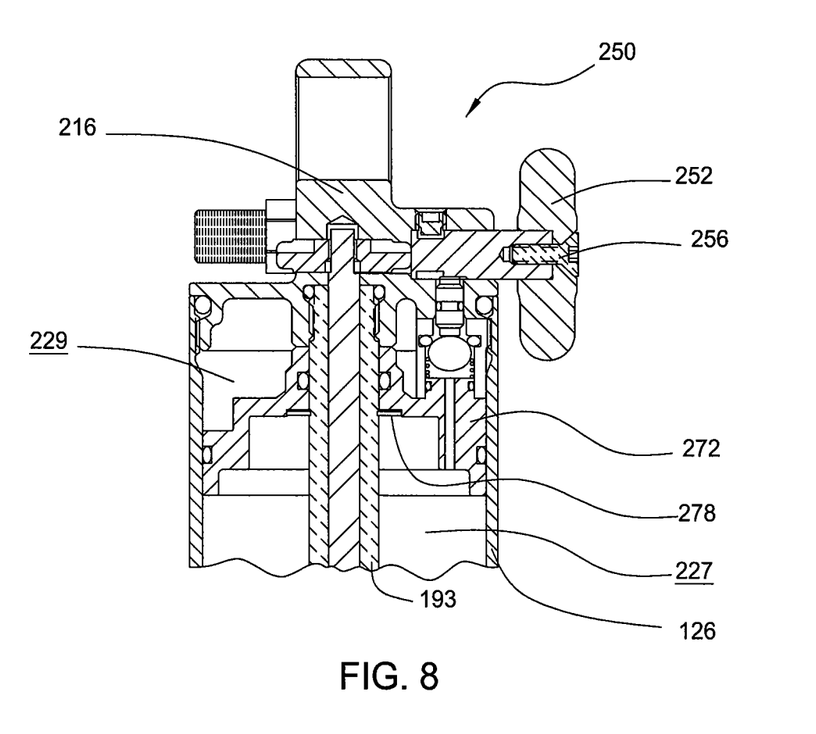
FIG. 8 is an enlarged partial sectional view of the suspension unit of FIG. 6.

FIGS. 7 and 8 show enlarged views illustrating this additional structure and modified structure, which will now be described in detail. In FIG. 8 and other drawings, various seals (such as a conventional O-ring seal between the air cylinder 126 and the air cylinder partition 272) are included in the drawing, but are not numbered or described, since they are conventional features well-known to those skilled in the art.

The detent ball assembly 260 provides a detenting effect such that, after adjustment, the travel adjust lever 252 is held in the selected position. It also provides tactile feedback to the operator to indicate attainment of a new position upon rotation. The travel adjust lever 252 is incorporated into the upper eyelet housing 216 and is secured to an actuating cam shaft 254 by a retaining screw 256. A surface of the actuating cam shaft 254 has a ball indent 255 spaced every 90-degrees on its outer surface near one end. A surface of a detent ball 262, urged by a detent spring 264 which is secured by a detent set screw 266, engages the ball indent 255. Thus, in an engaged position, the detent ball 262 engages one of the ball indents 255 and a first level of resistance to rotation of the travel adjust lever 252 is provided that, desirably, inhibits unintentional rotation of the lever 252, while still allowing the lever 252 to be rotated by hand. In an unengaged position, the detent ball 262 contacts a surface of the cam shaft 254 between the indents 255 and, desirably, provides little or no resistance to rotation of the travel adjust lever 252.

In FIG. 8, the retaining ring 278 serves to secure the axial location of the air cylinder partition 272 on the shaft 193.

Figure 9:
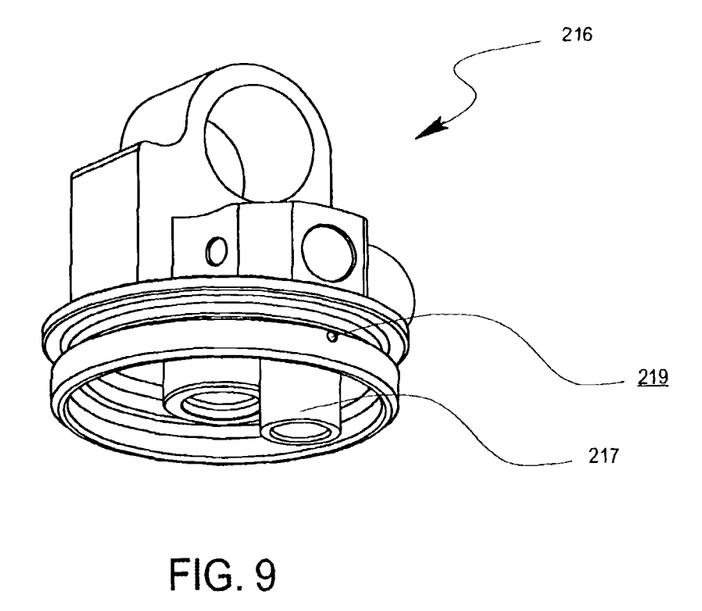
FIG. 9 is an isometric view of the upper eyelet housing of the suspension unit of FIG. 6.
Figure 10:
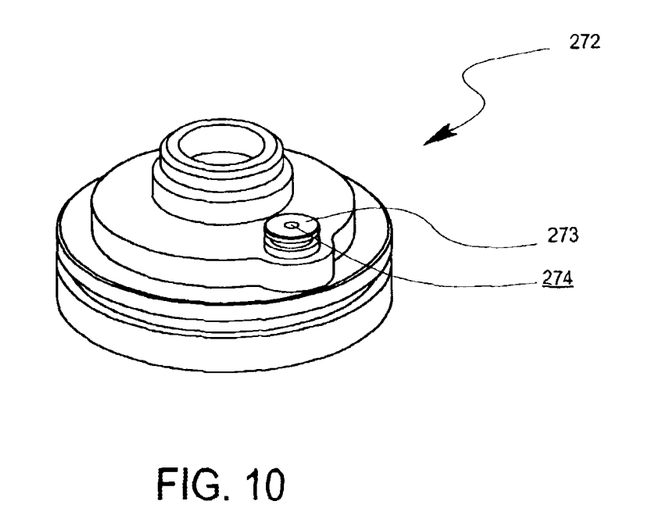
FIG. 10 is an isometric view of the air sleeve partition of the suspension unit of FIG. 6.
Figure 11:
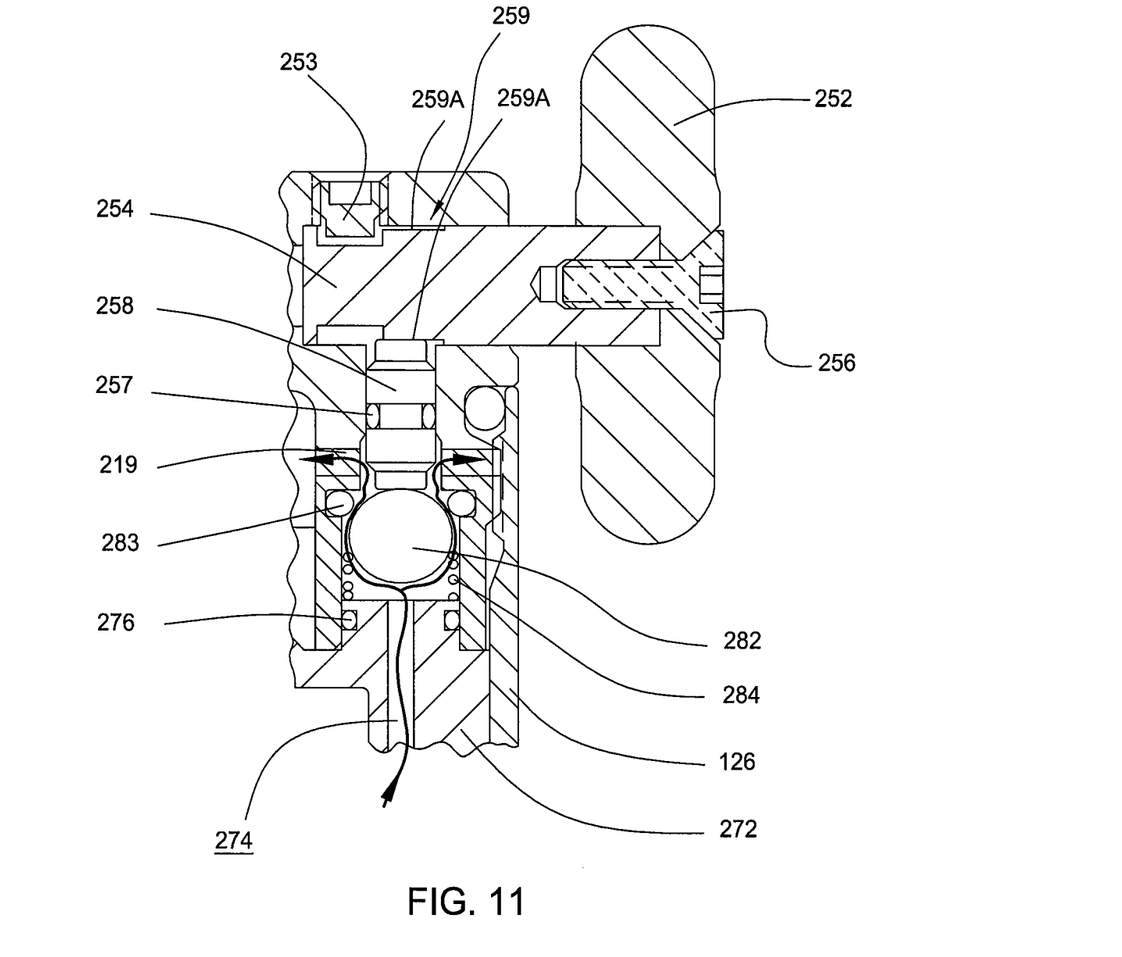
FIG. 11 is an enlarged partial sectional view of the switching mechanism of the suspension unit of FIG. 6, with the adjusting lever set so the air passage is open.

In order to facilitate clear visualization of the interface between the upper eyelet housing 216 and the air cylinder partition 272, FIG. 9 shows an isometric view of the upper eyelet housing 216, and FIG. 10 shows an isometric view of the air cylinder partition 272. As shown, the underside of the upper eyelet housing 216 includes a downwardly-projecting upper passage port coupler 217 which engages the upwardly-projecting lower passage port boss 273 thru which the lower passage port 274 passes. This connection is sealed by a lower passage port seal 276 as shown in FIG. 11. In addition, the upper eyelet housing 216 includes an upper passage port 219, which preferably extends completely through the upper passage port coupler 217, in a direction perpendicular to a longitudinal axis thereof, as shown in FIG. 11.

Figure 12:
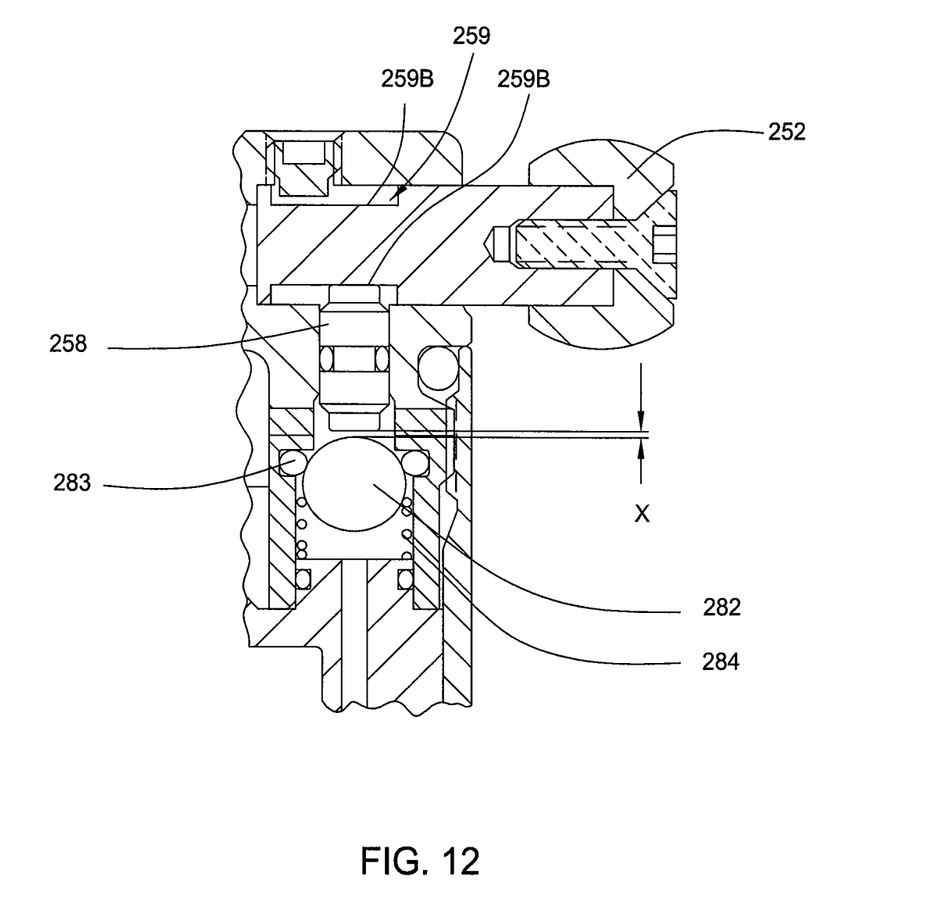
FIG. 12 is an enlarged partial sectional view of the switching mechanism of the suspension unit of FIG. 6, with the adjusting lever set so the air passage is closed.

FIG. 11 shows an enlarged partial sectional view of the travel adjust assembly 250, which is now described in detail. As previously described, the travel adjust lever 252 is secured to the actuating cam shaft 254 by a retaining screw 256. The actuating cam shaft 254 is retained in the upper eyelet housing 216 by a retaining screw 253. The actuating cam shaft 254 includes a cam profile 259. This cam profile 259 consists of 2 flats 259A 180-degrees apart as shown here in FIGS. 11, and 2 deeper flats 259B as shown in FIG. 12, which also are 180-degrees apart and are at 90-degrees from flats 259A. These flats control the position of the cam follower 258, as determined by the setting of the travel adjust lever 252. Cam follower 258 is sealed by cam follower seal 257.

With the travel adjust lever 252 in the position shown in FIG. 11, the cam follower 258 is in contact with the check ball 282 and maintains it in a position out of contact with the check ball seal 283. As shown by the heavy flow lines drawn, this enables air flow from the first partial volume 227 (not shown in this view) thru the lower passage port 274, past the check ball 282, thru the upper passage port 219, and into the second partial volume 229 (not shown in this view). This is one direction of air flow. The opposite direction of air flow is also enabled. These flows, of course, provide open communication between the first partial volume 227 and the second partial volume 229 such that their combined volume is available during compression of the suspension unit 200.

FIG. 12 shows the travel adjust lever 252 in the closed position. The cam follower 258, urged upward by internal air pressure, engages cam profile 259B and, as shown, moves away from check ball 282 by a distance "X", which is desirably 0.040" or more. The check ball 282, urged upward by the check ball spring 284 engages check ball seal 283. This seals off any upward air flow from first partial volume 227 to second partial volume 229.

However, this does not seal off flow in the opposite direction, since check ball spring 284 is specified to produce only a small spring force, for example about 0.03 to 0.05 pounds, with the check ball 282 in the sealed position. Accordingly, if the pressure from the second partial volume 229 above the check ball 282 exceeds the pressure below it from first partial volume 227 by approximately 3 to 5 psi, then this pressure differential will overcome the force of check ball spring 284 and check ball 282 will move downward away from sealing contact with check ball seal 283. In this event, air will flow from second partial volume 229 to first partial volume 227.

This characteristic is desirable in order to prevent unintended entrapment of excess air and pressure in the second partial volume 229. For correct function of the adjustable air spring assembly 210, it is preferred that the pressure in second partial volume 229 does not become significantly greater than the pressure in first partial volume 227. Such a situation would result in the pressure within the first partial volume 227 being reduced from its initial, preset level, due to the finite quantity of air within the suspension unit 200. As a result, the spring rate of the air spring 200 in its short travel mode (i.e., only utilizing the first partial volume 227) would be undesirably reduced from its initial setting. Rather, according to the preferred embodiments, the pressure in the second partial volume 229 preferably remains approximately equal to or less than the pressure in first partial volume 227, since the check ball spring 284 creates only a small preload force.

Although the above-described valve assembly is preferred for its simplicity, reliability and low manufacturing cost, other valve arrangements may also be employed. For example, a needle-type valve body may be used in place of the check ball 282. In an alternative arrangement, the cam surface 259 may directly contact the valve body (e.g., the check ball 282) and the cam follower 258 may be omitted. Further, the above-described functions of the valve assembly do not necessarily have to be performed by a single valve arrangement. For example, a first valve arrangement may selectively connect and disconnect the first partial volume 227 and second partial volume 229, while another valve arrangement provides the check valve function of preventing the pressure of the second partial volume 229 from becoming substantially greater than the pressure of the first partial volume 227.

Figures 13, 14:
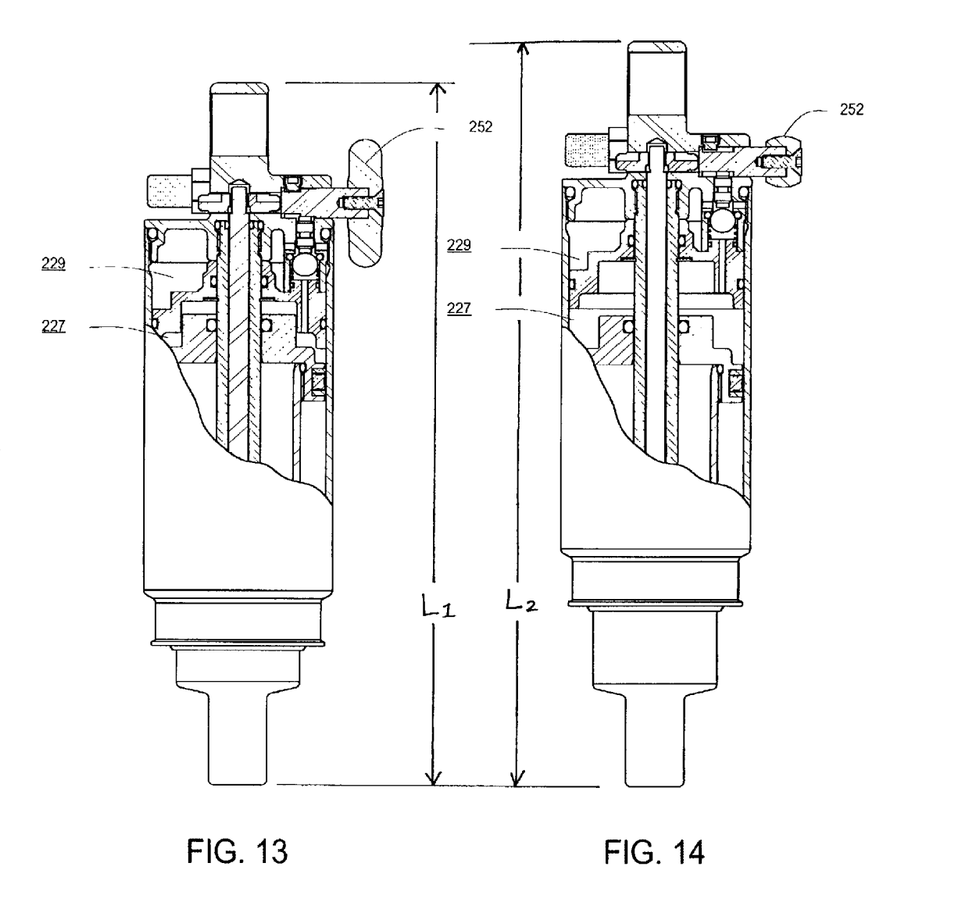
FIG. 13 is a partial sectional view of the suspension unit of FIG. 6, showing the approximate full travel position with the adjusting lever set in the open position.
FIG. 14 is a partial sectional view of the suspension unit of FIG. 6, showing the approximate full travel position with the adjusting lever set in the closed position.

FIG. 13 illustrates a typical full-travel position of suspension unit 200 when travel adjust lever 252 is set in the long-travel mode, such that first partial volume 227 and second partial volume 229 are in full communication.

Similarly, FIG. 14 illustrates a typical full-travel position of suspension unit 200 when travel adjust lever 252 is set in the short-travel mode, such that first partial volume 227 and second partial volume 229 are in not in communication.

Note that the overall compressed lengths of suspension unit 200 are different, with the length L.sub.1 in FIG. 13 being shorter than the length L.sub.2 in FIG. 14. This will be explained with reference to FIG. 15.

Figure 15:
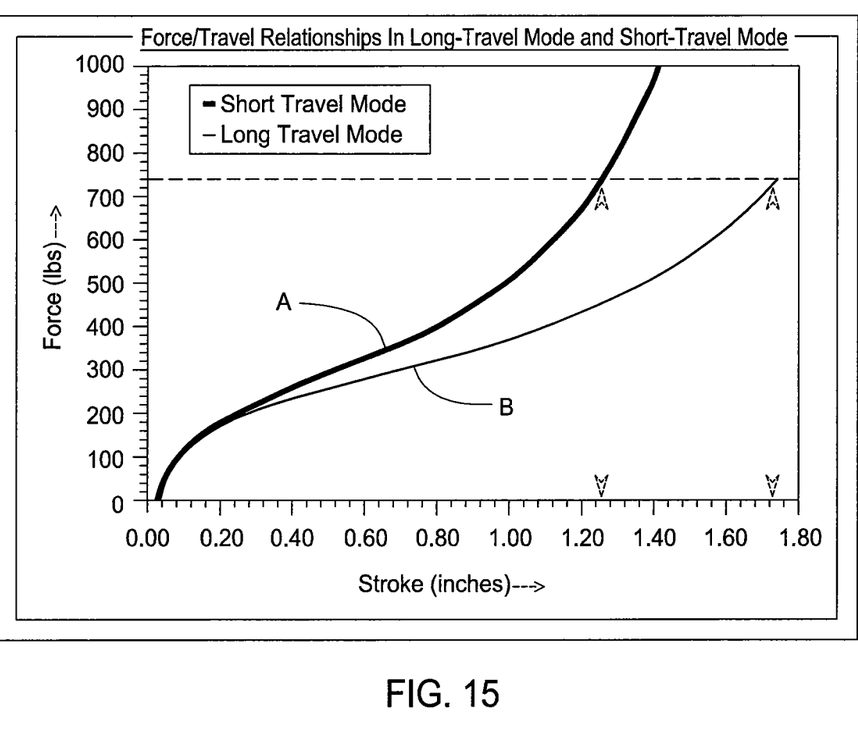
FIG. 15 illustrates the effect of the lever adjustment by comparing the spring curves of the suspension unit of FIG. 6 with the lever in the closed position, and with it in the open position.

FIG. 15 illustrates an example of the force-versus-travel relationships provided by suspension unit 200 in the two different selectable modes: the short-travel mode and the long-travel mode. In the long-travel mode, as shown by curve "B", the force rises more gradually and reaches, in this example, a value of 750 pounds at a stroke distance of about 1.75 inches. In the short-travel mode, as shown by curve "A", the force rises more rapidly and reaches a value of 750 pounds at a stroke distance of only about 1.27 inches, almost ½ inch less than the value for curve "B". This relationship, of course, is the basis for describing the two modes as "long-travel mode" and "short-travel mode".

It should be explained that, although for simplicity in the above example a final external compression force of 750 pounds on the suspension unit 200 is assumed for both cases, this is only an approximation. A rigorous computer motion analysis of a specific situation, centering on the basic equation of motion F=ma (force equals mass times acceleration), would show some difference, but this analysis is generally quite complicated and the difference would generally be relatively small. Thus, the above is a reasonably close approximation assuming that in both cases the vehicle upon which the suspension unit 200 is mounted is subjected to the same bump (or other terrain feature) and other conditions.

Additionally, it should be noted that at 1.27 inches of travel curve "A" is rising steeply. Thus, even if the final force that occurs in the short-travel mode is somewhat greater than the 750 pounds used in the above example, final travel would still be significantly less than curve "B". For example, even if the final force reached 1000 pounds, final travel would still only be slightly more than 1.40 inches. As a preferred embodiment of the present invention is as a shock absorber for a mountain bike, it is desirable that the final force is less than 3000 pounds, desirably, less than 2000 pounds and, more desirably, less than 1000 pounds. Such an arrangement allows the air spring to withstand the impact forces resulting from traversing rough terrain with suspension arrangements presently incorporated on mountain bikes (e.g., wheel travel/shock travel ratio). As will be appreciated by one of skill in the art, for other applications or suspension arrangements, the preferred final force may vary from the values recited above.

In the context of mountain bike suspension assemblies, preferably, the first partial volume 227 is between about 1 and 8 cubic inches. Desirably, the first partial volume 227 is between about 1.5 and 6 cubic inches and, more desirably, between about 2 and 4 cubic inches. Preferably, the second partial volume 229 is between about 0.3 and 4 cubic inches. Desirably, the second partial volume 229 is between about 0.4 and 3 cubic inches and, more desirably, between about 0.5 and 2 cubic inches. Such an arrangement provides a desirable spring rate of the suspension unit 200 when utilizing only the first partial volume 227, as well as when both the first partial volume 227 and second partial volume 299 are used to provide a spring force, for a substantial number of mountain bike applications.

In at least a significant portion of mountain bike suspension applications, it is preferable that the suspension unit 200 provides between about 0.5 and 3 inches of suspension travel in the short travel mode (i.e., utilizing only the first partial volume 227). Desirably, the suspension unit 200 provides between about 0.6 and 2.5 inches of travel and, more desirably, between about 0.75 and 2 inches of suspension travel in the short travel mode. Further, preferably the suspension unit provides between about 0.6 and 5 inches of suspension travel in the long travel mode (i.e., utilizing both the first partial volume 227 and the second partial volume 229). Desirably, the suspension unit 200 provides between about 0.8 and 4 inches of travel and, more desirably, between about 1 and 3 inches of suspension travel in the long travel mode. The range of values set forth above pertains to the relative movement between the two portions of the suspension unit 200 and the actual travel of the suspended bicycle wheel may vary from the travel of the suspension unit 200.

As described earlier, the differences between curve "A" and curve "B" result from the differences in initial chamber volume available during compression of the suspension unit 200. With the travel adjust lever 252 set as in FIG. 13, the total volume of both the first partial volume 227 and the second partial volume 229 are available. With the travel adjust lever 252 set as in FIG. 14, only the volume of first partial volume 227 is available.

These following example calculations will serve to clarify these concepts.

These calculations are based on the well-known Ideal Gas Law for isothermal processes, which is a good first approximation for illustrating the basic principles of the preferred embodiments. This law states that for an enclosed variable volume the internal pressure will vary with volume according to the equation:

$$(P1)*(V1)=(P2)*(V2)$$

where:
P1=initial gas (air) pressure
P2=second gas (air) pressure
V1=initial volume
V2=second volume Here is a simple example of this relationship. Assuming the initial conditions of a sealed, variable chamber are 10 cubic inches of air at 100 psi, if the volume is then reduced to 5 cubic inches the pressure will increase to 200 psi. Considered from another point of view, initial volume divided by final volume equals "compression ratio". In this example the compression ratio is 10 divided by 5, or a compression ratio of 2. Final pressure can be calculated by multiplying initial pressure times compression ratio: 100 psi times 2=200 psi.

In the example of FIGS. 13, 14, and 15, the initial first partial volume 227 of suspension unit 200 is 3.08 cubic inches, and the second partial volume 229 is 1.15 cubic inches. Thus, their combined volume is 4.23 cubic inches, and the volume of first partial volume 227 alone is just 3.08 cubic inches. For the configuration of this example, volume displaced by the seal head 194 per inch of stroke is 1.65 cubic inches per inch. The following sample calculations are made using these values:

For the configuration of FIG. 13, a compression ratio of 3.16 is reached at 1.75 inches of travel:
   initial total chamber volume=4.23 cubic inches
   reduced volume at 1.75 inches travel=1.75.times.1.65=2.89 cubic inches
   chamber volume at 1.75 inches travel=4.23−2.89=1.34 cubic inches
   Thus:
   compression ratio at 1.75 inches travel=(4.23)/(1.34)=3.16
For the configuration of FIG. 14, an almost identical compression ratio of 3.14 is reached at 1.27 inches of travel:
   initial total chamber volume=3.08 cubic inches
   reduced volume at 1.27 inches travel=1.27.times.1.65=2.10 cubic inches
   chamber volume at 1.27 inches travel=3.08−2.10=0.98 cubic inches
   Thus:
   compression ratio at 1.27 inches travel=(3.08)/(0.98)=3.14
For the configuration used in this example for suspension unit 200, and assuming an initial pressure of 150 psi, these compression ratios translate to an air spring force in both cases of about 750 pounds. However, the actual air spring force may vary depending on the specific application. Preferably, as described above, in the context of mountain bike suspension assemblies, the spring force is less than approximately 3000 pounds at a substantially fully compressed position of the air spring.

This example, of course, is by way of illustration only, and a wide spectrum of desired relationships between compression ratio and travel, and of the ratio of travel achieved in the short travel mode with that achieved in the long travel mode, can be attained with the illustrated embodiments by designing a particular variable air spring with appropriate dimensional relationships. Preferably, the percentage of travel achieved in the short travel mode with that achieved in the long travel mode is between about 40 and 90 percent. Desirably, the percentage of travel achieved in the short travel mode with that achieved in the long travel mode is between about 50 and 85 percent and, more desirably, between about 60 and 80 percent. Such a change in travel provides desirable suspension performance in both the short travel and long travel modes for at least a significant portion of typical suspension arrangements presently incorporated on mountain bikes.

FIG. 16 shows an alternate preferred embodiment. As discussed previously, this embodiment is somewhat simplified and less costly than the embodiment of FIG. 6. The embodiment of FIG. 16 is possible for suspension units which are generally similar to that of FIG. 6, but provided that no thru-shaft damping adjustment feature, such as shown in FIG. 6, is required. As shown in FIG. 16, when a thru-shaft damping adjustment feature is not required, then the upper end of the shaft 393 becomes available for incorporation of the travel adjust feature. Thus, the travel adjust valve in the embodiment illustrated in FIG. 16 generally extends along a central axis A of the shock shaft 393, which allows a simpler and more cost-effective structure.

In this embodiment, the travel adjust assembly 350 uses the same travel adjust lever 252 as utilized previously. The actuating cam shaft 354 is similar to the previous actuating cam shaft 254, but is somewhat longer. The upper eyelet housing 316 is similar to the previous upper eyelet housing 216, but is somewhat simpler and less costly to produce due to elimination of the previously-required off-center upper passage port coupler 217 which was depicted in FIG. 9. The air cylinder partition 372 is similar to the previous air cylinder partition 272, but it also is somewhat simpler and less costly to produce due in this case to elimination of the previously-required off-center lower passage port boss 273 which was depicted in FIG. 10. The lower passage port 374 and the upper passage port 319, as shown, both consist of a cross-holes drilled in the shaft 393. The upper passage port 319 further consists of drilled or milled passageways in the lower portion of the upper eyelet housing 316 which communicate with the drilled passageways in the shaft 393.

The other elements of the travel adjust assembly 350 as shown in FIG. 16 are neither numbered nor described here since they are essentially identical to the elements numbered and described in the embodiment of FIG. 6.

The present invention is not limited to the above embodiments and various changes may be made within the technical scope of the invention as understood by a person skilled in the art without departing from the spirit and scope thereof.

The invention claimed is:
1. A suspension unit operable between a compressed position and an extended position, comprising:
   a fixed volume chamber filled with gas;
   a variable volume chamber filled with gas for biasing the suspension unit toward the extended position; and a valve assembly, comprising:
  a first valve member operable between:
    an open position where the first valve member provides open fluid communication between the gas chambers such that volumes of the gas chambers are effectively combined during compression of the suspension unit, and
    a closed position where the first valve member prevents gas flow from the variable volume chamber to the fixed volume chamber while allowing flow from the fixed volume chamber to the variable volume chamber, and
  an actuator for physically positioning the first valve member in the open or closed position through physical contact between the valve member and the actuator, the actuator selectively movable by a user between the open and closed positions, wherein the actuator comprises a cam shaft operable between a first position and a second position by operation of a first external accessible controller and a cam follower positionable by the cam shaft to maintain the valve member in an open position when the cam shaft is in the first position and to allow the valve to close when the cam shaft is in the second position;
a compression chamber at least substantially filled with damping fluid;
a rebound chamber at least substantially filled with the damping fluid; and
a damping piston operable to dampen flow of the damping fluid between the compression chamber and the rebound chamber in response to movement of the suspension unit between the positions.

2. The suspension unit of claim 1, wherein the first valve member is further operable from the closed position to the open position in response to pressure in the fixed volume chamber exceeding pressure in the variable volume chamber.

3. The suspension unit of claim 1, wherein the valve assembly further comprises:
  the first controller operably coupled to the first valve member via the cam shaft and cam follower,
  wherein the first valve member is operable from the closed position to the open position in response to operation of the first controller.

4. The suspension unit of claim 3, wherein the first controller is hand operable.

5. The suspension unit of claim 3, wherein:
  the first valve member is a ball,
  the valve assembly further comprises:
    a seal; and
    a spring biasing the ball toward the seal, and
  the ball seats on the seal in the closed position.

6. The suspension unit of claim 5, wherein the cam shaft is operable between the first position and the second position by operation of the first controller, wherein the cam shaft:
  maintains the ball away from the seal in the first position, and
  allows the ball to seat on the seal in the second position, and;
  the cam shaft is rotatable between the first position and the second position to selectively position a recessed and a non recessed portion thereof into contact with the cam follower.

7. The suspension unit of claim 1, wherein the position of the cam follower relative to the first controller is not fixed.

8. The suspension unit of claim 1, wherein the cam shaft extends in a first direction and the cam follower extends from the cam shaft in a second, different, direction.

9. A suspension unit operable between a compressed position and an extended position, comprising:
  a fixed volume chamber filled with gas;
  a variable volume chamber filled with gas;
  a valve assembly, comprising:
    a valve member that prevents gas flow from the variable volume chamber to the fixed volume chamber, but allows gas flow from the fixed volume chamber to the variable volume chamber, and that is movable by an external controller to a position that opens fluid communication between the fixed and variable volume chambers;
  a damper assembly at least substantially filled with damping fluid; and
  a cam shaft movable between a first position and a second position by operation of the external controller, and a cam follower positioned between a third position and a fourth position, wherein the cam follower is configured to contact the valve assembly and maintain the valve assembly closed in the third position, and enable the valve assembly to open in the fourth position, and the cam follower is not fixed to the cam shaft.

10. The suspension unit of claim 9, wherein the external controller is hand operable.

11. The suspension unit of claim 10, wherein the valve member is a ball.

12. The suspension unit of claim 11, wherein the valve assembly further comprises:
  a seal; and
  a spring biasing the ball toward the seal.

13. The suspension unit of claim 12, wherein the cam follower is positionable to by the cam shaft to maintain the ball away from the seal in the fourth position, and allows the ball to seat on the seal in the third position.

14. The suspension unit of claim 9, wherein the cam shaft extends in a first direction and the cam follower extends from the cam shaft in a second, different, direction.

* * * * *